April 2, 1963   C. H. MEYSAN ETAL   3,083,491
ELECTRIFIED FISHING LURE
Filed May 18, 1962
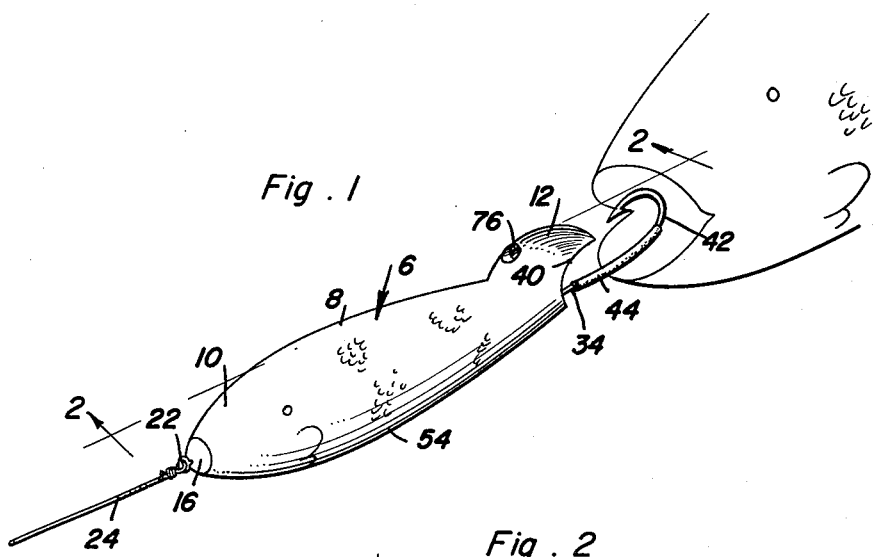
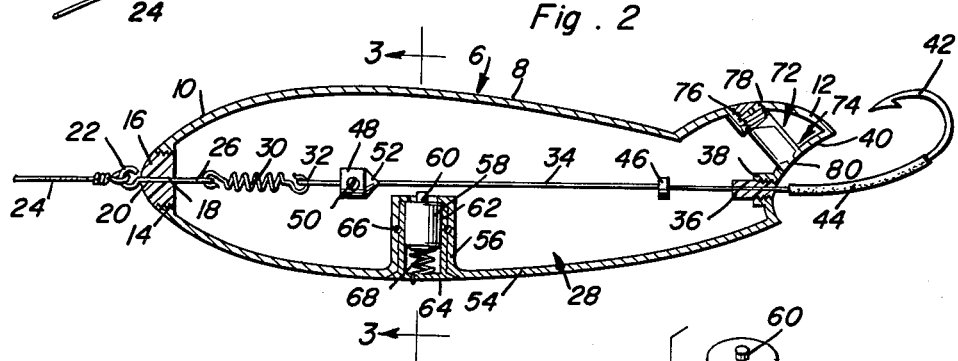
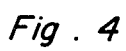
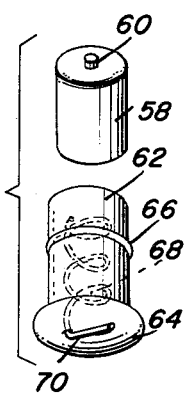
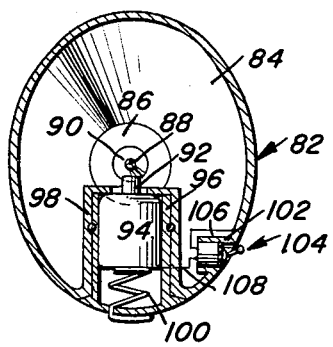
Charles H. Meysan
Lloyd A. Clifton
INVENTORS
BY *O'Brien*
*and Jackson*
Attorneys

United States Patent Office 3,083,491
Patented Apr. 2, 1963

3,083,491
ELECTRIFIED FISHING LURE
Charles H. Meysan and Lloyd A. Clifton, Lone Pine, Calif.; said Clifton assignor to said Charles H. Meysan
Filed May 18, 1962, Ser. No. 195,833
10 Claims. (Cl. 43—17.1)

This invention relates to a novel and improved hook-equipped lure which is unique in that it utilizes a charge of electricity to shock and stun a fish when the fish takes the hook.

Briefly, the lure comprises a suitably constructed plug with or without a chum pot or equivalent bait. An electric current conducting pull-actuated fishhook is operatively mounted in the plug. The plug is provided with means for generating an electric charge which comes into play when the pull on the hook serves to operate responsive circuit make and break means in the plug.

More specifically the invention is characterized by a hollow metal plug. This plug is shaped to imitate or represent a suitable minnow and embodies a body portion, head portion and tail portion. A current conducting fish hook makes the catch by stunning (or executing) the victim fish. This hook is original in that it has a long shank slidingly mounted in an insulated bushing in the tail portion. The hook on the rear end is exposed and accessible to the fish. The major portion of the shank extends into the hollow chamber of the plug, is connected to a coil spring which in turn is joined to a sliding link mounted in an insulated nose-plug or insert, the line being attached to the link. A suitably mounted flashlight battery serves as the source of current and is energized when a contact element on the spring-loaded shank is pulled by the fish into engagement with the contact element or electrode embodied in the battery.

The general objective is to provide a simple, practical and reliable lure to catch fish. It is structurally and functionally distinctive, as will be apparent from the following description and accompanying drawings, and serves the purposes for which it is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of an electrified fishing lure or plug constructed in accordance with the principles of the present invention and showing the manner in which it is to be used;

FIGURE 2 is a view on an enlarged scale with parts in section and elevation and which is taken on the approximate longitudinal section line 2—2 of FIGURE 1, looking in the direction of the arrows;

FIGURE 3 is an enlarged cross-section taken on the plane of the vertical line 3—3 of FIGURE 2 and wherein a slight modification in construction (the utilization of a switch) is shown; and FIGURE 4 is an enlarged exploded perspective view showing the component parts which go to make up the source of electric current or charge generating means.

Inasmuch as FIG. 3 shows a slight modification in the overall concept it will be treated as a separate embodiment of the invention. Therefore, reference is made first to FIGS. 1, 2 and 4 and primarily to FIG. 2. Here the numeral 6 designates the plug. This plug is preferably constructed from metal and is therefore conductive and may be considered as one pole of the power or current supply. It is shaped to represent an appropriate lure and is of hollow elongated construction and includes a central body portion 8, a head portion 10 at the leading or forward end and a tail portion 12 at the rearward or trailing end. The axial portion of the head 10 is provided with a screw-threaded opening 14 to accommodate screw-threads on an insertable and removable nose plug 16, said plug provided with an axial passage or bore 18 and being constructed of insulation material. It will be noted that a relatively short rod or equivalent member 20 is slidably mounted in the bore and has an eye 22 on the outer or forward end to accommodate the leader 24 of the fishing line. There is also a similar eye 26 on the rearward end located within the hollow portion which is here designated as the chamber 28. One end of a suitably tensioned coil spring 30 is connected to the eye 26. The other end of the coil spring is connected to a coacting eye 32 on the forward end of the elongated shank portion or shank 34 of the fishing hook. The rearward portion of the shank is slidingly mounted in an insulated bushing 36 which is fitted into a mounting neck 38 provided therefor in the concave portion 40 of the tail 12. That portion of the shank beyond the bushing is fashioned into a barbed fishhook 42. A sleeve 44 of insulation material is mounted on the extending shank portion and constitutes a limit stop in that it is in alignment with the fixed bushing 36. That portion of the shank in the chamber is provided with a washer or the like 46 which constitutes a stop and which is engageable with the forward end of the bushing to limit the stroke or movement of the shank 34. This fishhook is of conductive material and consequently functions in conjunction with the conductive plug 6. It will be noted that a metal sleeve 48 is mounted on the forward end portion of the shank and in fact is held in place by a setscrew or the like 50 whereby to permit this element to be adjusted. This sleevge or element constitutes a relatively movable contact element and has a conical rearward end 52. The median part of the ventral surface 54 is provided with an integral inwardly projecting part 56 which is cylindrical in cross-section and projects into the chamber and constitutes a receiver and support for the electric charge generating means. This well-like receiver opens through the bottom of the ventral side to accommodate an insertable and removable flashlight battery 58. The electrode of this battery projects up through an opening provided therefor in the receiver and is consequently located in the path of travel of the movable contact element 48. These two elements 48 and 60 provide circuit make and break means. The dry cell battery is removably fitted into a cup-like holder 62 which is provided therefor. This holder has a cap 64 on the bottom which fits into the opening at the bottom of the receiver in the manner illustrated in FIG. 2. The exterior central portion of the holder or cup is provided with a retainer ring 66 which provides a snap fastener and which snaps removably into a seating groove therefor in the receiver 56 as shown. The battery is fitted telescopically into the receptacle portion of the holder or cup 62 and a coil spring 68 is anchored therein as at 70. When the holder is plugged into the receiver it positions the battery in the operative position shown in FIG. 2.

The coil spring 30 is normally relaxed and serves to position the contact element 48 in the manner shown. Consequently when the component parts are in the relationship depicted in FIG. 2 the plug or lure is in readiness to make the catch. When the fish takes the hook in the manner suggested in FIG. 1 and exerts a pull rearwardly or in a direction from left to right in the drawing the fishhook as an entity is slid rearwardly relative to the plug. The angler with line in hand having noticed that he has a fish on the line will take up the slack, if any, in the line and consequently when a pull of sufficient weight or intensity has been exerted on the hook 42 the shank 34 will slide rearwardly through the bushing 36 and when the conical end 52 of the contact element 54 engages the contact 60, the circuit will be closed and the electric current thus generated will be conducted to the hook to achieve the end result desired in that the fish will be caught and shocked or stunned depending on the intensity of the electric current which has been generated.

If high voltage is required for killing or stunning other such devices to step up the basic voltage may be used in the construction of the lure. Circuits similar to those used in photo-strobe units or photo-flash systems may be used to step up voltage. If high voltage is used in the construction of the lure, a safety shut-off switch must be used to protect the fisherman.

The use of bait with this lure is an optional procedure and any suitable bait, if desired, may be placed directly on the hook. An alternative procedure is to provide a simple relatively small chum pot 72 which is fitted into the space 74 in the manner shown in FIG. 2. To accomplish this the tail portion is provided with an internally screw-threaded socket 76 into which the screw-threaded end portion of the chum pot, as at 78, is screwed. The discharge end of the chum pot at 80 may be lined up with suitable orifices (not detailed) in the concave side 40 to permit the chum to ooze out.

The coil spring 30 is of a type to normally return the movable contact element 48 to the open circuit position shown in FIG. 2 when there is no pull on the fishhook.

It is evident that the fishhook 42 serves as one pole or electrode and that the body of the lure, when in a body of water and in use, serves as the other pole.

With reference now to FIG. 3 the construction is basically the same as that already described in that it comprises a hollow metal plug 82 the forward end 84 of which has a nose plug of insulation 86 screwed therein as already described. Here the shank is denoted at 88 and the movable circuit make and break or contact element at 90 the same to cooperate with the stationary contact element 92 on the flashlight battery 94 fitting into the holding cup 96 which in turn is fitted into the receiver 98. In this arrangement the coil spring 100, instead of being of current conducting material is non-conductive. Also in this arrangement a suitable neck 102 serves to support an exteriorly controllable switch 104 which is a safety switch. One wire 106 on the switch is connected to the wall of the plug and the complemental wire 108 is electrically connected to the dry cell battery 94. With this switch arrangement accidental electric shock to the user of the plug is prevented. Also with this construction it is an easier matter to remove the fish from the hook after having been retrieved. It is also within the purview of the invention, instead of incorporating the switch as shown in FIG. 3, to provide a remote controlled switch. Remote arrangement of the safety switch could be accomplished by running wires (not shown) up the leader to the fishing line.

It is believed that a careful consideration of the description in conjunction with the views of the drawing will enable the reader to obtain a clear and comprehensive understanding of the invention, the construction and arrangement of the cooperating component parts, the mode of use and operation as well as the features and advantages. Therefore, a more lengthy description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electric-type fish shocking and stunning lure comprising a plug, current conducting pull-actuated fishhook means having an elongated shank slidingly mounted on and carried by said plug, said shank having an accessible barbed hook at its rearward end, means slidingly mounted on the forward end of said plug and operatively connected to a forward end of said shank, means also carried by said plug for generating an electric charge, said last-named means embodying a stationary contact element, and a movable complemental circuit make and break contact element carried by said shank and lined up with and movable into and out of engagement with said stationary contact, said movable contact element being normally disengaged from the stationary contact element but coming into play and engaging the stationary contact element in response to a pull on the hook.

2. The structure defined in claim 1, and wherein said second-named means comprises a link slidingly mounted on said plug, said line being connected to one end of said link, and a normally relaxed coil spring connecting the other end of said link to said shank.

3. The structure defined in claim 2, and wherein said electric charge generating means comprises a spring-biased flashlight battery the electrode of which constitutes the aforementioned stationary contact element.

4. The structure according to claim 3, and wherein said plug is made of current conductive material, said shank and first-named means being also made of conductive material and being insulated from cooperating portions of said plug.

5. The combination of claim 4, and in combination, a chum pot carried by said plug and located within the vicinity of said barbed hook.

6. An electrified fish shocking and stunning lure comprising: a hollow plug, said plug being made of current conductive material, being shaped to imitate a minnow and embodying a body portion, head portion and tail portion, said head portion having an axially bored nose plug made of insulation material embodied therein, a link slidable in the bore of said nose-plug, the forward end of said link projecting outwardly beyond said nose-plug for connection of a fishing line thereto, the inner end projecting into the hollow chamber of said plug, a bushing of insulation material mounted axially in the tail portion in line with said nose-plug, a fishhook of conductive material having a shank passing slidingly though the bore of the bushing into said chamber, a coil spring connecting the forward end of said shank to said link, the rearward end of said shank projecting beyond the bushing and tail portion and terminating in a barbed fishhook spaced from said tail portion, means mounted in said chamber for generating a charge of electricity, and cooperating circuit make and break means between said first-named means and a cooperating portion of said shank.

7. The structure according to claim 6, and wherein said electric charge generating means comprises a dry cell battery mounted in said chamber with its electrode arranged in proximity to a coacting slidable portion of said shank but spaced therefrom, said electrode providing a relatively stationary contact element, and a complemental contact element carried by said shank, normally separated therefrom but movable into engagement therewith when a fish takes said hook, exerts a pull on the shank in a manner to extend the spring and shifts the shank and movable contact element into engagement with the stationary contact element.

8. The structure according to claim 7, and wherein said complemental contact element is adjustable on said shank, and in combination, a limit stop on said shank spaced from but adapted to abut an adjacent end of said bushing.

9. The structure according to claim 7, and wherein said body portion is provided with a fixed well in said chamber opening through a surface of the body portion and providing an open-bottom receiver, a cup fitting telescopically and removably into the receiver, said cup providing a holder, said battery being removably mounted in said holder, and a coil spring confined in the holder between the bottom thereof and bottom of said battery.

10. The structure according to claim 8, and wherein said last-named coil spring is made of non-conductive material, and in combination, a switch embodied in a wall of the chamber having enclosed wires, one of which is connected to the wall and the other one of which is electrically connected to said battery.

References Cited in the file of this patent

UNITED STATES PATENTS

| | | |
|---|---|---|
| 1,838,981 | Anderson | Dec. 29, 1931 |

FOREIGN PATENTS

| | | |
|---|---|---|
| 666,621 | France | May 27, 1929 |
| 1,205,627 | France | Aug. 17, 1959 |
| 56,869 | Sweden | Nov. 12, 1918 |